(12) United States Patent  
Gandhi et al.

(10) Patent No.: US 12,192,090 B2  
(45) Date of Patent: Jan. 7, 2025

(54) PAIRING DISAGGREGATED NETWORK ELEMENTS

(71) Applicant: Cisco Technology, Inc., San Jose, CA (US)

(72) Inventors: Indermeet Singh Gandhi, San Jose, CA (US); Shailender Potharaju, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 562 days.

(21) Appl. No.: 17/497,426

(22) Filed: Oct. 8, 2021

(65) Prior Publication Data

US 2023/0116026 A1    Apr. 13, 2023

(51) Int. Cl.  
 *H04L 45/02* (2022.01)
(52) U.S. Cl.  
 CPC .................................... *H04L 45/02* (2013.01)
(58) Field of Classification Search  
 CPC ....................................................... H04L 45/02  
 See application file for complete search history.

(56) References Cited

U.S. PATENT DOCUMENTS

| | | | |
|---|---|---|---|
| 7,685,295 B2 | 3/2010 | Myers et al. | |
| 10,326,532 B2 | 6/2019 | Ashrafi | |
| 10,708,141 B2 | 7/2020 | Berger et al. | |
| 10,797,968 B2 | 10/2020 | Suthar et al. | |
| 10,992,497 B2 | 4/2021 | Patel et al. | |
| 11,012,872 B1 | 5/2021 | Bellamkonda et al. | |
| 2019/0245740 A1 | 8/2019 | Kachhla | |

(Continued)

FOREIGN PATENT DOCUMENTS

| | | |
|---|---|---|
| EP | 3101846 A1 | 12/2016 |
| WO | 2019027711 A1 | 2/2019 |

(Continued)

OTHER PUBLICATIONS

3GPP, "3rd Generation Partnership Project; Technical Specification Group Services and System Aspects; Telecommunication management; Data formats for multi-vendor plug and play eNode B connection to the network (Release 16)," 3GPP TS 32.509 V16.0.0(Jul. 2020), Technical Specification, Jul. 2020, 13 pages.

(Continued)

*Primary Examiner* — Bo Hui A Zhu  
(74) *Attorney, Agent, or Firm* — Edell, Shapiro & Finnan, LLC (57) ABSTRACT

Techniques are described herein for pairing disaggregated network elements. In one example, a pairing manager obtains an indication to prioritize high availability when pairing disaggregated network elements. The disaggregated network elements include first disaggregated network elements and second disaggregated network elements. The pairing manager obtains, from one or more of the disaggregated network elements, topology information of the disaggregated network elements. Based on the topology information and the indication to prioritize high availability, the pairing manager pairs topologically-adjacent ones of the first disaggregated network elements with different ones of the second disaggregated network elements.

20 Claims, 5 Drawing Sheets

(56) References Cited

U.S. PATENT DOCUMENTS

| | | |
|---|---|---|
| 2020/0110627 A1 | 4/2020 | Chou et al. |
| 2020/0128414 A1 | 4/2020 | Mishra et al. |
| 2020/0145175 A1 | 5/2020 | Hassan Hussein et al. |
| 2020/0204252 A1 | 6/2020 | Barbieri et al. |
| 2020/0260296 A1 | 8/2020 | Mishra et al. |
| 2020/0267576 A1 | 8/2020 | Bedekar et al. |
| 2020/0304408 A1 | 9/2020 | Suthar et al. |
| 2021/0014737 A1 | 1/2021 | Yang et al. |
| 2021/0021494 A1 | 1/2021 | Yao et al. |
| 2021/0045011 A1 | 2/2021 | Mishra et al. |
| 2021/0045193 A1 | 2/2021 | Mishra et al. |
| 2021/0144517 A1 | 5/2021 | Guim Bernat et al. |
| 2021/0176823 A1 | 6/2021 | Mishra et al. |
| 2021/0243839 A1 | 8/2021 | Krishnaswamy et al. |
| 2021/0314211 A1 | 10/2021 | Grayson |
| 2022/0217704 A1* | 7/2022 | Lekutai ................. H04W 76/15 |

FOREIGN PATENT DOCUMENTS

| | | |
|---|---|---|
| WO | 2019035750 A1 | 2/2019 |
| WO | 2021034906 A1 | 2/2021 |

OTHER PUBLICATIONS

3GPP, "3rd Generation Partnership Project; Technical Specification Group Services and System Aspects; Telecommunication management; Procedure flows for multi-vendor plug-and-play eNode B connection to the network (Release 16)," 3GPP TS 32.508 V16.0.0 (Jul. 2020), Technical Specification, Jul. 2020, 20 pages.

O-RAN Alliance, "O-RAN Alliance Working Group 4—Management Plane Specification," O-RAN.WG4.MP.0-v04.00, Technical Specification, Jul. 2020, 184 pages.

Cisco, "Cisco Open Plug-n-Play Agent Configuration Guide, Cisco IOS Release 15SY," Revised: Dec. 16, 2014, 35 pages.

Ericsson AB, Huawei Technologies Co. Ltd, NEC Corporation and Nokia, "Common Public Radio Interface: eCPRI Interface Specification," eCPRI Specification V2.0 (May 10, 2019), Interface Specification, May 2019, 109 pages.

O-RAN, "Transport Layer and ORAN Fronthaul Protocol Implementation," https://docs.o-ran-sc.org/projects/o-ran-sc-o-du-phy/en/latest/Transport-Layer-and-ORAN-Fronthaul-Protocol-Implementation_fh.html, Jan. 2021, 22 pages.

Ericsson AB, Huawei Technologies Co. Ltd, NEC Corporation and Nokia, "Common Public Radio Interface: eCPRI Interface Specification," eCPRI Specification V1.1 (Jan. 10, 2018), Interface Specification, Jan. 2018, 62 pages.

ITU-T, "Operation, administration and maintenance (OAM) functions and mechanisms for Ethernet-based networks," Series G: Transmission Systems and Media, Digital Systems and Networks Packet over Transport aspects—Ethernet over Transport aspects; Series Y: Global Information Infrastructure, Internet Protocol Aspects and Next-Generation Networks; Internet protocol aspects—Operation, administration and maintenance, G.8013/Y. 1731 (Aug. 2015), Aug. 2015, 102 pages.

Peng, et al., "Recent Advances in Underlay Heterogeneous Networks: Interference Control, Resource Allocation, and Self-Organization," IEEE Communication Surveys & Tutorials, vol. 17, No. 2, Second Quarter 2015, May 2015, 30 pages.

Arslan, et al., "Software-Defined Networking in Cellular Radio Access Networks: Potential and Challenges," IEEE Communications Magazine, Jan. 2015, 7 pages.

Jordan, "Open RAN 101-RU, DU, CU: Why, what, how, when?," RCR Wireless News, Reader Forum, https://www.rcrwireless.com/20200708/open_ran/open-ran-101-ru-du-cu-reader-forum, Jul. 2020, 17 pages.

Shekar Sundaramurthy et al., "5G—PNF Plug and Play", Developer Wiki, Confluence, Aug. 7, 2019, 35 pages.

E. Voit et al., "Custom Subscription to Event Notifications draft-ietf-netconf-subscribed-notifications-05", NETCONF, Oct. 2, 2017, 33 pages.

3GPP, 3rd Generation Partnership Project; Technical Specification Group Services and System Aspects; Telecommunication management; Self-configuration of network elements; Concepts and requirements (Release 15), 3GPP TS 32.501 V15.0.0 (Jun. 2018), 29 pages.

3GPP, 3rd Generation Partnership Project; Technical Specification Group Services and System Aspects; Management and orchestration; Generic management services; (Release 16), 3GPP TS 28.532 V16.3.0 (Mar. 2020), 230 pages.

Sadayuki Abeta et al., "O-RAN Alliance Standardization Trends", NTT Docomo Technical Journal, vol. 21, No. 1, Jul. 2019, 8 pages.

ONAP, "VES Collector", ONAP, 2019, 22 pages, retrieved from Internet Apr. 18, 2020; https://docs.onap.org/en/elalto/submodules/dcaegen2.git/docs/sections/apis/ves.html.

K. Watsen et al., "NETCONF Call Home and RESTCONF Call Home", Internet Engineering Task Force (IETF), Feb. 2017, 13 pages.

R. Enns, Ed et al., "Network Configuration Protocol (NETCONF)", Internet Engineering Task Force (IETF), Jun. 2011, 113 pages.

M. Scott et al., "Yang Module for NETCONF Monitoring", Internet Engineering Task Force (IETF), Oct. 2010, 28 pages.

R. Enns, Ed et al., "NETCONF Configuration Protocol", Network Working Group, Dec. 2006, 95 pages.

T. Lemon et al., "Node-specific Client Identifiers for Dynamic Host Configuration Protocol Version Four (DHCPv4)", Network Working Group, Feb. 2006, 12 pages.

S. Alexander et al., "DHCP Options and BOOTP Vendor Extensions", Network Working Group, Mar. 1997, 34 pages.

O-RAN Alliance, "Management Plane Specification", O-RAN Alliance Working Group 4, ORAN-WG4.MP.0-v02.00.00, 2019, 149 pages.

O-RAN Alliance, "O-RAN Operations and Maintenance Interface Specification V02.00", O-RAN-WG1.O1-Interface-v02.00, 2019, 47 pages.

ONAP, "8.61.7.3.7.1 Datatype: pnfRegistrationFields", ONAP Master Documentation, 1 page, retrieved from Internet Aug. 11, 2021; https://docs.onap.org/projects/onap-vnfrqts-requirements/en/latest/Chapter8/ves_7_2/ves_event_listener_7_2.html#datatype-pnfregistrationfields.

Marge Hillis et al., "O-RAN Working Group 1 O-RAN Operations and Maintenance Interface Specification", O-RAN.WG1.O1-Interface.0-v03.00, O-RAN Alliance, revised Mar. 3, 2020, 52 pages.

O-RAN Alliance, "O-RAN Alliance Working Group 4 Management Plane Specification", O-RAN.WG4.MP.0-v03.00, revised Apr. 17, 2020, 178 pages.

O-RAN Alliance, "O-RAN Alliance Working Group 4 Management Plane Specification", ORAN-WG4.MP.0-v01.00, revised Mar. 11, 2019, 125 pages.

O-RAN Alliance, "This module defines the YANG definitions for managing the O-RAN Radio Unit management plane interface", revised Jul. 26, 2021, www.o-ran.org, 6 pages.

3GPP, 3rd Generation Partnership Project; Technical Specification Group Services and System Aspects; Telecommunication management; Inventory Management (IM) network resources Integration Reference Point (IRP); Network Resource Model (NRM) (Release 11), 3GPP TS 32.692 V11.0.0, Sep. 2012, 26 pages.

Trevor Lovett, "8.61. Service: VES Event Listener 7.2.1", ONAP Master Documentation, Revised Jan. 16, 2021, 98 pages; https://docs.onap.org/projects/onap-vnfrqts-requirements/en/latest/Chapter8/ves_7_2/ves_event_listener_7_2.html.

3GPP, 3rd Generation Partnership Project; Technical Specification Group Services and System Aspects; Telecommunication management; Data formats for multi-vendor plug and play eNode B connection to the network (Release 15), 3GPP TS 32.509 V15.0.0 (Jun. 2018), 13 pages.

3GPP, 3rd Generation Partnership Project; Technical Specification Group Services and System Aspects; Telecommunication management; Procedure flows for multi-vendor plug-and-play eNode B connection to the network (Release 15), 3GPP TS 32.508 V15.0.0 (Jun. 2018), 20 pages.

* cited by examiner

PAIRING DISAGGREGATED NETWORK ELEMENTS

TECHNICAL FIELD

The present disclosure relates to computer networking.

BACKGROUND

Components of Radio Access Networks (RANs) can be disaggregated into Radio Units (RUs), Distributed Units (DUs) and Centralized Units (CUs). RUs are responsible for handling at least part of one or more lower layers of the protocol stack, and are located topologically close to the User Equipment (UE). CUs are responsible for handling at least part of one or more upper layers of the protocol stack, and are located topologically far from the UE. DUs are responsible for handling at least part of one or more remaining layers of the protocol stack, and are located between RUs and CUs.

DESCRIPTION OF EXAMPLE EMBODIMENTS

Overview

Techniques are described herein for pairing disaggregated network elements. In one example embodiment, a pairing manager obtains an indication to prioritize high availability when pairing disaggregated network elements. The disaggregated network elements include first disaggregated network elements and second disaggregated network elements. The pairing manager obtains, from one or more of the disaggregated network elements, topology information of the disaggregated network elements. Based on the topology information and the indication to prioritize high availability, the pairing manager pairs topologically-adjacent ones of the first disaggregated network elements with different ones of the second disaggregated network elements.

EXAMPLE EMBODIMENTS

Figure 1:
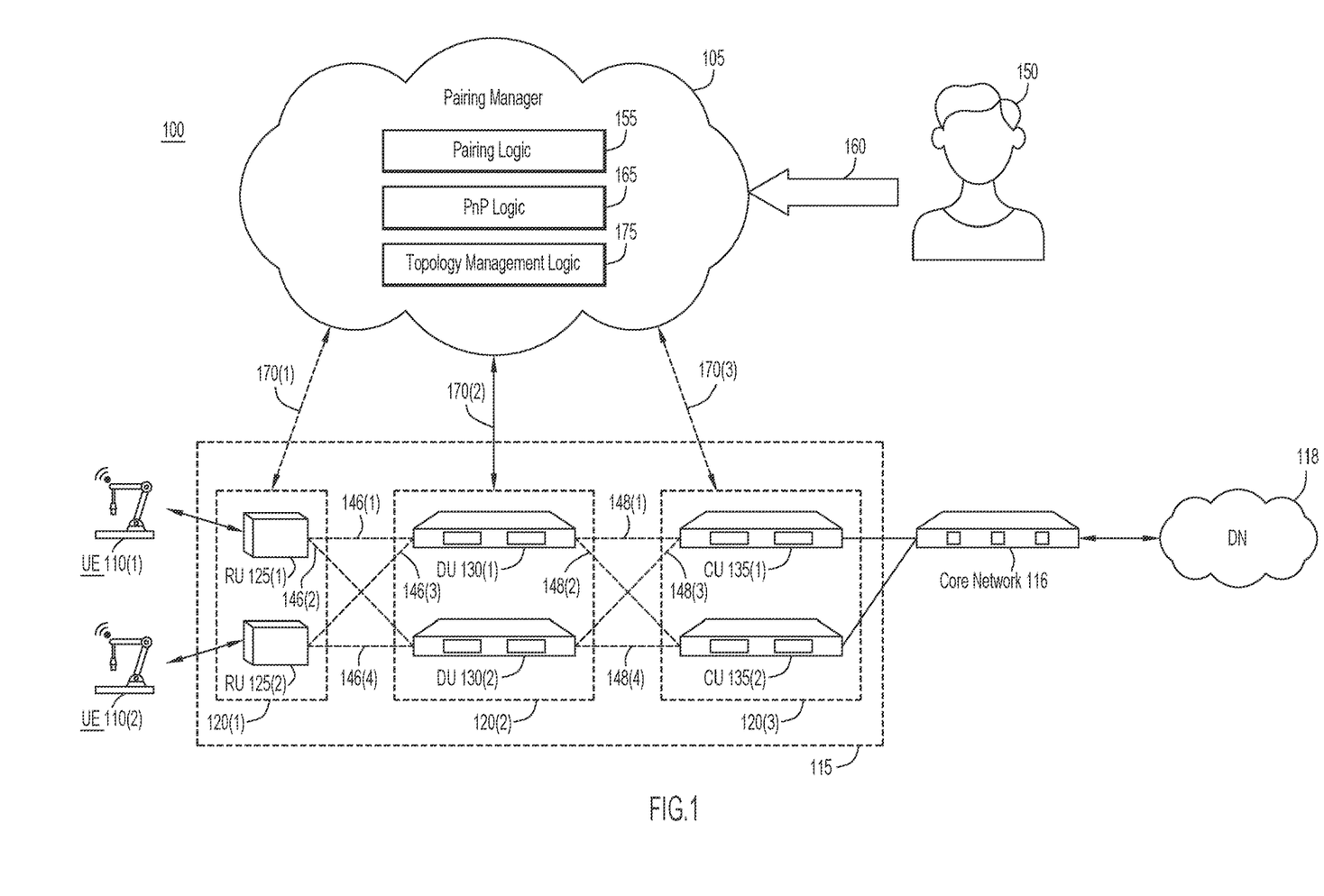
FIG. 1 illustrates a system configured to pair disaggregated network elements, according to an example embodiment.

FIG. 1 illustrates an example system 100 configured for disaggregated network element pairing. System 100 includes pairing manager 105, UEs 110(1) and 110(2), disaggregated network elements 115, core network 116, and Data Network (DN) 118. Disaggregated network elements 115 include disaggregated network elements 120(1)-120(3). Disaggregated network elements 120(1) include RUs 125(1) and 125(2); disaggregated network elements 120(2) include DUs 130(1) and 130(2); and disaggregated network elements 120(3) include CUs 135(1) and 135(2).

System 100 may be configured for any suitable cellular technology, such as a Radio Access Network (RAN). Specific examples of suitable RAN systems may include virtual RAN (vRAN) and Open RAN (O-RAN) systems. If system 100 is a vRAN system, pairing manager 105 may include an enterprise controller configured to manage an enterprise network. If system 100 is an O-RAN system, pairing manager 105 may be a Service Management and Orchestration (SMO) entity. Pairing manager 105 may include one or more local or cloud servers that host any suitable function element(s).

UEs 110(1) and 110(2) may be associated with any suitable device configured to initiate a flow in system 100. For example, UEs 110(1) and 110(2) may include one or more computers, vehicles and/or any other transportation-related devices having electronic devices configured thereon, automation devices, enterprise devices, appliances, Internet of Things (IoT) devices, Personal Digital Assistant (PDAs), laptops or electronic notebooks, cellular telephones, smartphones, tablets, Internet Protocol (IP) phones, and/or any other devices and/or combination of devices, components, elements, and/or objects capable of initiating voice, audio, video, media, or data exchanges within system 100. UEs 110(1) and 110(2) may also include any suitable interface to a human user such as a microphone, a display, a keyboard, or other terminal equipment. UEs 110(1) and 110(2) may also be any devices that seek to initiate a communication on behalf of another entity or element such as a program, a database, or any other component, device, element, or object capable of initiating an exchange within system 100. UEs 110(1) and 110(2) may be configured with appropriate hardware (e.g., processor(s), memory element(s), antennas and/or antenna arrays, baseband processors (modems), and/or the like), software, logic, and/or the like to facilitate respective over-the-air (air) interfaces for accessing/connecting to RUs 125(1) and 125(2). It will be appreciated that any number of UEs may be present in system 100.

Core network 116 may include any suitable core network elements. In one example, core network 116 may be a 5G core network, and may include 5G core network elements such as a Session Management Function (SMF), Access and Mobility Management Function (AMF), User Plane Function (UPF), etc.

DN 118 may be any combination of the Internet, an IP Multimedia Subsystem (IMS), Ethernet network, Ethernet switching system(s), and/or the like. DN 118 may facilitate user plane (e.g., user data/data transfer) connectivity for per-access UE sessions. For example, UEs 110(1) and 110(2) may access various services, applications, etc. from DN 118.

Disaggregated network elements 115 are configured to handle/process/transmit network communications (e.g., network packets) between UEs 110(1) and 110(2) and core network 116. Core network 116 is, in turn, configured to transmit the network communications between disaggregated network elements 115 and DN 118. Thus, system 100 may provide network connectivity between UEs 110(1) and 110(2) and DN 118 via disaggregated network elements 115.

Disaggregated network elements 115 may be paired to each other to enable transmission of network communications between UEs 110(1) and 110(2) and core network 116. For example, if RU 125(1) and DU 130(1) are paired together, RU 125(1) and DU 130(1) may exchange network communications sourced from or destined to UE 110(1). Similarly, if DU 130(1) and CU 135(1) are paired together, DU 130(1) and CU 135(1) may exchange network communications sourced from or destined to UE 110(1).

FIG. 1 illustrates potential front-haul pairings 146(1)-146(4) and potential mid-haul pairings 148(1)-148(4). Potential front-haul pairings 146(1) and 146(2) may pair RU 125(1) with DU 130(1) and 130(2), respectively; and potential front-haul pairings 146(3) and 146(4) may pair RU 125(2) with DU 130(1) and 130(2), respectively. Potential mid-haul pairings 148(1) and 148(2) may pair DU 130(1) with CU 135(1) and 135(2), respectively; and potential mid-haul pairings 148(3) and 148(4) may pair DU 130(2) with CU 135(1) or 135(2), respectively.

Conventionally, network administrator 150 would use a RAN Element Management System (EMS) to manually pair disaggregated network elements 115 in a static mapping configuration. However, pairing manually is prone to error, and the resulting pairings can be difficult to reconfigure/repair in response to network topology changes. Also, the management constraints on network administrator 150 involved in manual pairing would become increasingly burdensome as the network scales. In addition, the manual pairing implemented by network administrator 150 would not necessarily represent an optimized network configuration.

Accordingly, in order to minimize error, facilitate repairing, reduce burden on network administrator 150, and optimize network configuration, pairing manager 105 is provided with pairing logic 155. In one example, pairing logic 155 may cause pairing manager 105 to automatically determine which of potential front-haul pairings 146(1)-146(4) and potential mid-haul pairings 148(1)-148(4) to implement. For instance, pairing manager may obtain an intent of network administrator 150 (e.g., high availability or low latency) and automatically translate the intent to one or more pairings of disaggregated network elements 115. Pairing manager 105 may automatically pair disaggregated network elements 115 as part of Day-0 operations to configure disaggregated network elements 115. Pairing logic 155 may reside on a server located in pairing manager 105 (as illustrated in FIG. 1), on a separate node such as a RAN Intelligent Controller (RIC), on CU 135(1) and/or 135(2), etc.

The following description first discusses specific example operations for pairing disaggregated network elements 120(1) and 120(2), and then discusses specific example operations for pairing disaggregated network elements 120(2) and 120(3). However, it will be appreciated that pairing manager 105 may perform operations for pairing disaggregated network elements 120(1) and 120(2) before, while, or after performing operations for pairing disaggregated network elements 120(2) and 120(3).

The discussion of operations for pairing disaggregated network elements 120(1) and 120(2) is provided as follows.

In one example, pairing manager 105 may provide an intent-based pairing visualization to enable network administrator 150 to select an intent (e.g., high availability or low latency). Network administrator 150 may provide, to pairing manager 105, an indication to prioritize high availability when pairing disaggregated network elements 115. As represented by arrow 160, pairing manager 105 obtains the indication to prioritize high availability when pairing disaggregated network elements 115.

During operation, disaggregated network elements 120(1) and 120(2) may boot up and obtain respective IP addresses from a Dynamic Host Configuration Protocol (DHCP) server. Disaggregated network elements 120(1) and 120(2) may register with pairing manager 105 using Plug-and-Play (PnP) logic 165. PnP logic 165 may enable pairing manager 105 to communicate with disaggregated network elements 115. In one specific example, each of RU 125(1), RU 125(2), DU 130(1), and DU 130(2) may include a local PnP agent that allows the respective RU 125(1), RU 125(2), DU 130(1), and DU 130(2) to register with PnP logic 165. For example, the local PnP agents may perform a Day-0 call-home on behalf of RUs 125(1) and 125(2) and DUs 130(1) and 130(2). PnP logic 165 may reside on a PnP server located in pairing manager 105 (as illustrated in FIG. 1) or in the cloud.

As represented by arrow 170(1), pairing manager 105 may share, with disaggregated network elements 120(1), one or more addresses of disaggregated network elements 120 (2). As a result, both RU 125(1) and 125(2) may obtain the one or more addresses of DU 130(1) and 130(2).

The one or more addresses of disaggregated network elements 120(2) may be any suitable address(es), such as Media Access Control (MAC) addresses, IP addresses, etc. If the addresses are MAC addresses, pairing manager 105 may obtain the MAC addresses of DU 130(1) and 130(2) from PnP logic 165 before sharing the MAC addresses with disaggregated network elements 120(1). If the addresses shared with disaggregated network elements 120(1) are IP addresses, the IP addresses may be respective unicast addresses of disaggregated network elements 120(2) or a multicast address of disaggregated network elements 120(2). The unicast addresses may be the IP addresses assigned to DU 130(1) and DU 130(2) by the DHCP server. The multicast address may be subscribed to by disaggregated network elements 120(2).

Rather than obtaining the address(es) of disaggregated network elements 120(2) from pairing manager 105, the address(es) may also/alternatively be hardcoded into RUs 125(1) and 125(2). Or disaggregated network elements 120(1) may obtain the one or more addresses of disaggregated network elements 120(2) from discovery messages sent from DUs 130(1) and 130(2) to RUs 125(1) and 125(2). The discovery messages sent from DUs 130(1) and 130(2) to RUs 125(1) and 125(2) are discussed below.

Using the one or more addresses of disaggregated network elements 120(2), at least one of disaggregated network elements 120(1) may obtain topology information from disaggregated network elements 120(2). For example, RUs 125(1) and 125(2) may initiate discovery messages to the address(es) of disaggregated network elements 120(2) to discover the existence of DUs 130(1) and 130(2), and DUs 130(1) and 130(2) may respond to the discovery messages. In one example, RUs 125(1) and 125(2) may be on the same subnet as DUs 130(1) and 130(2) to enable discovery. RUs 125(1) and 125(2) may run a discovery protocol to obtain topology information and build a topology map. RUs 125(1) and 125(2) may run any suitable discovery protocol, such as Link Layer Discovery Protocol (LLDP), Cisco Discovery Protocol (CDP), etc.

As further represented by arrow 170(1), disaggregated network elements 120(1) may report the results of the discovery protocol (e.g., topology information) to topology management logic 175. Topology management logic 175 may be configured to gather, process, and maintain topology information of disaggregated network elements 115. Topology management logic 175 may reside on a server located in pairing manager 105 (as illustrated in FIG. 1), on a separate node such as a RAN Intelligent Controller (RIC), on CU 135(1) and/or 135(2), etc.

As represented by arrow 170(2), pairing manager 105 may share, with disaggregated network elements 120(2), one or more addresses of disaggregated network elements 120(1). As a result, both DU 130(1) and 130(2) may obtain the one or more addresses of RU 125(1) and 125(2). It will be appreciated that pairing manager 105 may share the one or more addresses of disaggregated network elements 120(1) with disaggregated network elements 120(2) (arrow 170(2)) before, while, or after pairing manager 105 shares the one or more addresses of disaggregated network elements 120(2) with disaggregated network elements 120(1) (arrow 170(1)).

The one or more addresses of disaggregated network elements 120(1) may be any suitable address(es), such as MAC addresses, IP addresses, etc. If the addresses are MAC addresses, pairing manager 105 may obtain the MAC addresses of RU 125(1) and 125(2) from PnP logic 165 before sharing the MAC addresses with disaggregated network elements 120(2). If the addresses are IP addresses, the IP addresses may be respective unicast addresses of disaggregated network elements 120(1) or a multicast address of disaggregated network elements 120(1). The unicast addresses may be the IP addresses assigned to RU 125(1) and RU 125(2) by the DHCP server. The multicast address may be subscribed to by disaggregated network elements 120(1).

Rather than obtaining the address(es) of disaggregated network elements 120(1) from pairing manager 105, the address(es) may also/alternatively be hardcoded into DUs 130(1) and 130(2). Or disaggregated network elements 120(2) may obtain the one or more addresses of disaggregated network elements 120(1) from the discovery messages sent from RUs 125(1) and 125(2) to DUs 130(1) and 130(2).

Using the one or more addresses of disaggregated network elements 120(1), at least one of disaggregated network elements 120(2) may obtain topology information from disaggregated network elements 120(1). For example, DUs 130(1) and 130(2) may initiate discovery messages to the address(es) of disaggregated network elements 120(1) to discover the existence of RUs 125(1) and 125(2), and RUs 125(1) and 125(2) may respond to the discovery messages. In one example, disaggregated network elements 120(2) may be on the same subnet as RUs 125(1) and 125(2) to enable discovery. DUs 130(1) and 130(2) may run a discovery protocol to obtain topology information and build a topology map. DUs 130(1) and 130(2) may run any suitable discovery protocol, such as LLDP, CDP, etc.

At least one of disaggregated network elements 120(2) may also obtain latency information from disaggregated network elements 120(1) using the one or more addresses of disaggregated network elements 120(1). For example, DUs 130(1) and 130(2) may initiate delay measurement messages (e.g., one-way delay measurements, such as measurements taken using message type #5 according to the enhanced Common Public Radio Interface (eCPRI)) to the address(es) of disaggregated network elements 120(1).

As further represented by arrow 170(2), disaggregated network elements 120(2) may report the results of the discovery protocol (e.g., topology information) to topology management logic 175. As still further represented by arrow 170(2), disaggregated network elements 120(2) may also report the results of the delay measurements (e.g., latency information) to pairing manager 105.

Thus, pairing manager 105 (e.g., topology management logic 175) may obtain, from disaggregated network elements 120(1) and 120(2), topology information of disaggregated network elements 120(1) and 120(2). Pairing manager 105 may also obtain, from disaggregated network elements 120(2), latency information of disaggregated network elements 120(1) and 120(2). However, it will be appreciated that pairing manager 105 may obtain topology and/or latency information from each of RU 125(1), RU 125(2), DU 130(1), and DU 130(2), or from any suitable subset of disaggregated network elements 120(1) and 120(2).

In one example, pairing manager 105 may obtain the latency information from disaggregated network elements 120(1) instead of disaggregated network elements 120(2). In that case, at least one of disaggregated network elements 120(1) may obtain latency information from disaggregated network elements 120(2) using the one or more addresses of disaggregated network elements 120(2). In particular, RUs 125(1) and 125(2) may initiate delay measurement messages (e.g., one-way delay measurements, such as measurements taken using message type #5 according to the eCPRI) to the address(es) of disaggregated network elements 120(2) and report the resulting latency information to pairing manager 105. Pairing manager 105 may obtain the topology and latency information from any suitable entity/entities in any suitable order.

Pairing logic 155 may process the latency information, and topology management logic 175 may process the topology information. In one example, topology management logic 175 may create a topology map of disaggregated network elements 120(1) and 120(2). Pairing manager 105 may obtain the topology map generated by topology management logic 175 and determine an optimized pairing for disaggregated network elements 120(1) and 120(2) based on the intent of network administrator 150 (e.g., the indication to prioritize high availability). In particular, pairing manager 105 may decide to apply the high availability intent by pairing adjacent ones of disaggregated network elements 120(1) with different (e.g., alternating) ones of disaggregated network elements 120(2). As explained in greater detail below in connection with FIG. 2A, this pairing configuration may maintain coverage and minimize network impact even when one of disaggregated network elements 115 fails.

Thus, based on the topology information and the indication to prioritize high availability, pairing manager 105 may pair topologically-adjacent ones of disaggregated network elements 120(1) with different ones of disaggregated network elements 120(2). Pairing manager 105 may notify disaggregated network elements 120(1) and 120(2) of the pairings. Disaggregated network elements 120(1) and 120 (2) may implement the pairings, obtain carrier and front-haul latency configuration, and start operation. The pairings between the disaggregated network elements 120(1) and 120(2) may occur over the Layer 2 (L2) or Layer 3 (L3) domain. In one instance, implementing the pairings among disaggregated network elements 120(1) and 120(2) may include configuring processing element endpoints for disaggregated network elements 120(1) and 120(2). For example, per O-RAN specifications, a 'processing element endpoint' is the O-RAN construct used to configure flows (that can be used for data flow transport, measurement operations, etc.) on the interface between RUs and the DU with which each RU is assigned.

In various embodiments, a processing element endpoint configuration, depending on the transport type/network connectivity (e.g., Ethernet, IP, etc.) between each DU/RU, may identify any of: different (alias) MAC addresses, virtual local area network (VLAN) identity and MAC addresses; and/or User Datagram Protocol (UDP) ports and Internet Protocol (IP) addresses for the DU to which each RU is assigned. A particular processing element endpoint definition configured for a given RU/DU assignment can be provided a 'name' or other identifier that can be used by other systems, nodes, etc. (e.g., pairing manager 105) to tie certain flows to DUs.

Pairing manager 105 may provide a toggle option to switch from a high availability intent to a low-latency intent. In one example, network administrator 150 may provide, to pairing manager 105, an indication to prioritize low-latency when re-pairing disaggregated network elements 115. As further represented by arrow 160, pairing manager 105 may obtain the indication to prioritize low-latency when re-pairing disaggregated network elements 115.

Pairing manager 105 may determine an optimized pairing for disaggregated network elements 120(1) and 120(2) based on the intent of network administrator 150 (e.g., the indication to prioritize low latency). In particular, pairing manager 105 may decide to apply the low latency intent using lowest-latency front-haul links. As explained in greater detail below in connection with FIG. 2B, this pairing configuration may provide low latency service for UEs 110(1) and 110(2).

Thus, based on the latency information and the indication to prioritize low latency, pairing manager 105 may re-pair each of disaggregated network elements 120(1) with a corresponding one of disaggregated network elements 120(2) over a link having a lowest available latency. Pairing manager 105 may notify disaggregated network elements 120(1) and 120(2) of the latency-based pairings. Disaggregated network elements 120(1) and 120(2) may implement the latency-based pairings, obtain carrier and front-haul latency configuration, and start or continue operation. The latency-based automated pairing may improve latency measurements between disaggregated network elements 120(1) and 120(2). The latency-based pairings between disaggregated network elements 120(1) and 120(2) may occur over the L2 or L3 domain.

If two or more latency-based pairs provide the same latency, pairing manager 105 may use one or more tie-breaking factors to select one of the pairs. The tie-breaking factors may include the load on each of disaggregated network elements 120(1) and 120(2), minimum hops associated with the pairing, least-cost path associated with the pairing, etc. Pairing manager 105 may obtain information regarding the tie-breaking factors from disaggregated network elements 120(1) and/or 120(2). Load information may be reported after disaggregated network elements 120(1) and/or 120(2) have finished booting up (e.g., post-Day-0/1). For instance, disaggregated network elements 120(1) and/or 120(2) may report the load information periodically or when the load exceeds a threshold load value.

The discussion of operations for pairing disaggregated network elements 120(2) and 120(3) is now provided as follows.

As discussed above in relation to arrow 160, pairing manager 105 may obtain the indication to prioritize high availability when pairing disaggregated network elements 115. Disaggregated network elements 120(2) and 120(3) may boot up and obtain respective IP addresses from a DHCP server. Disaggregated network elements 120(2) and 120(3) may register with pairing manager 105 (e.g., PnP logic 165). In one specific example, each of DU 130(1), DU 130(2), CU 135(1), and CU 135(2) may include a local PnP agent that allows the respective DU 130(1), DU 130(2), CU 135(1), and CU 135(2) to register with PnP logic 165. For example, the local PnP agents may perform a Day-0 call-home on behalf of DUs 130(1) and 130(2) and CUs 135(1) and CU 135(2).

As represented by arrow 170(2), pairing manager 105 may share, with disaggregated network elements 120(2), one or more addresses of disaggregated network elements 120(3). As a result, both DU 130(1) and 130(2) may obtain the one or more addresses of CU 135(1) and 135(2).

The one or more addresses of disaggregated network elements 120(3) may be any suitable address(es), such as IP addresses. The IP addresses may be respective unicast addresses of disaggregated network elements 120(3) or a multicast address of disaggregated network elements 120(3). The unicast addresses may be the IP addresses assigned to CU 135(1) and CU 135(2) by the DHCP server. The multicast address may be subscribed to by disaggregated network elements 120(3).

Rather than obtaining the address(es) of disaggregated network elements 120(23 from pairing manager 105, the multicast address may also/alternatively be hardcoded into DUs 130(1) and 130(2). Or disaggregated network elements 120(2) may obtain the one or more addresses of disaggregated network elements 120(3) from discovery messages sent from CUs 135(1) and 135(2) to DUs 130(1) and 130(2). The discovery messages sent from CUs 135(1) and 135(2) to DUs 130(1) and 130(2) are discussed below.

Using the one or more addresses of disaggregated network elements 120(3), at least one of disaggregated network elements 120(2) may obtain topology information from disaggregated network elements 120(3). For example, DUs 130(1) and 130(2) may initiate discovery messages to the address(es) of disaggregated network elements 120(3) to discover the existence of CUs 135(1) and 135(2), and CUs 135(1) and 135(2) may respond to the discovery messages. DUs 130(1) and 130(2) may run a discovery protocol to obtain topology information and build a topology map. DUs 130(1) and 130(2) may run any suitable discovery protocol, such as Link Layer Discovery Protocol (LLDP), Cisco Discovery Protocol (CDP), etc. As further represented by arrow 170(2), disaggregated network elements 120(2) may report the results of the discovery protocol (e.g., topology information) to topology management logic 175.

As represented by arrow 170(3), pairing manager 105 may share, with disaggregated network elements 120(3), one or more addresses of disaggregated network elements 120(2). As a result, both CU 135(1) and 135(2) may obtain the one or more addresses of DU 130(1) and 130(2). It will be appreciated that pairing manager 105 may share the one or more addresses of disaggregated network elements 120(2) with disaggregated network elements 120(3) (arrow 170(3)) before, while, or after pairing manager 105 shares the one or more addresses of disaggregated network elements 120(3) with disaggregated network elements 120(2) (arrow 170(1)).

The one or more addresses of disaggregated network elements 120(2) may be any suitable address(es), such as IP addresses. The IP addresses may be respective unicast addresses of disaggregated network elements 120(2) or a multicast address of disaggregated network elements 120(2). The unicast addresses may be the IP addresses assigned to DU 125(1) and DU 125(2) by the DHCP server. The multicast address may be subscribed to by disaggregated network elements 120(2).

Rather than obtaining the address(es) of disaggregated network elements 120(2) from pairing manager 105, the address(es) may also/alternatively be hardcoded into CUs 135(1) and 135(2). Or disaggregated network elements 120(3) may obtain the one or more addresses of disaggregated network elements 120(2) from the discovery messages sent from the DUs 130(1) and 130(2).

Using the one or more addresses of disaggregated network elements 120(2), at least one of disaggregated network elements 120(3) may obtain topology information from disaggregated network elements 120(2). For example, CUs 135(1) and 135(2) may initiate discovery messages to the address(es) of disaggregated network elements 120(2) to discover the existence of DUs 130(1) and 130(2), and DUs 130(1) and 130(2) may respond to the discovery messages. CUs 135(1) and 135(2) may run a discovery protocol to obtain topology information and build a topology map. CUs 135(1) and 135(2) may run any suitable discovery protocol, such as LLDP, CDP, etc.

At least one of disaggregated network elements 120(3) may also obtain latency information from disaggregated network elements 120(2) using the one or more addresses of disaggregated network elements 120(2). For example, CUs 135(1) and 135(2) may initiate delay measurement messages (e.g., one-way delay measurements, such as measurements taken using message type #5 according to the eCPRI) to the address(es) of disaggregated network elements 120(2).

As further represented by arrow 170(3), disaggregated network elements 120(3) may report the results of the discovery protocol (e.g., topology information) to topology management logic 175. As still further represented by arrow 170(3), disaggregated network elements 120(3) may also report the results of the delay measurements (e.g., latency information) to pairing manager 105.

Thus, pairing manager 105 (e.g., topology management logic 175) may obtain, from disaggregated network elements 120(2) and 120(3), topology information of disaggregated network elements 120(2) and 120(3). Pairing manager 105 may also obtain, from disaggregated network elements 120(3), latency information of disaggregated network elements 120(2) and 120(3). However, it will be appreciated that pairing manager 105 may obtain topology and/or latency information from each of DU 130(1), DU 130(2), CU 135(1), and 135(2) or from any suitable subset of disaggregated network elements 120(2) and 120(3).

In one example, pairing manager may obtain the latency information from disaggregated network elements 120(2) instead of disaggregated network elements 120(3). In that case, at least one of disaggregated network elements 120(2) may obtain latency information from disaggregated network elements 120(3) using the one or more addresses of disaggregated network elements 120(3). In particular, DUs 130(1) and 130(2) may initiate delay measurement messages (e.g., one-way delay measurements, such as measurements taken using message type #5 according to the eCPRI) to the address(es) of disaggregated network elements 120(3) and report the resulting latency information to pairing manager 105. Pairing manager 105 may obtain the topology and latency information from any suitable entity/entities in any suitable order.

Pairing logic 155 may process the latency information, and topology management logic 175 may process the topology information. In one example, topology management logic 175 may create a topology map of disaggregated network elements 120(2) and 120(3). Pairing manager 105 may obtain the topology map generated by topology management logic 175 and determine an optimized pairing for disaggregated network elements 120(2) and 120(3) based on the intent of network administrator 150 (e.g., the indication to prioritize high availability). In particular, pairing manager 105 may decide to apply the high availability intent by pairing adjacent ones of disaggregated network elements 120(2) with different (e.g., alternating) ones of disaggregated network elements 120(3). As explained in greater detail below in connection with FIG. 2A, this pairing configuration may maintain coverage and minimize network impact even when one of disaggregated network elements 115 fails.

Thus, based on the topology information and the indication to prioritize high availability, pairing manager 105 may pair topologically-adjacent ones of disaggregated network elements 120(2) with different ones of disaggregated network elements 120(3). Pairing manager 105 may notify disaggregated network elements 120(2) and 120(3) of the pairings. Disaggregated network elements 120(2) and 120(3) may implement the pairings, obtain carrier and mid-haul latency configuration, and start operation. The pairings between the disaggregated network elements 120(2) and 120(3) may occur over the L3 domain.

As discussed above in relation to arrow 160, pairing manager 105 may obtain the indication to prioritize low-latency when re-pairing disaggregated network elements 115. Pairing manager 105 may determine an optimized pairing for disaggregated network elements 120(2) and 120(3) based on the intent of network administrator 150 (e.g., the indication to prioritize low latency). In particular, pairing manager 105 may decide to apply the low latency intent using lowest-latency mid-haul links. As explained in greater detail below in connection with FIG. 2B, this pairing configuration may provide low latency service for UEs 110(1) and 110(2).

Thus, based on the latency information and the indication to prioritize low latency, pairing manager 105 may re-pair each of disaggregated network elements 120(2) with a corresponding one of disaggregated network elements 120(3) over a link having a lowest available latency. Pairing manager 105 may notify disaggregated network elements 120(2) and 120(3) of the latency-based pairings. Disaggregated network elements 120(2) and 120(3) may implement the latency-based pairings, obtain carrier and mid-haul latency configuration, and start or continue operation. The latency-based automated pairing may improve latency measurements between disaggregated network elements 120(2) and 120(3). The latency-based pairings between the disaggregated network elements 120(2) and 120(3) may occur over the L3 domain.

If two or more latency-based pairs provide the same latency, pairing manager 105 may use one or more tie-breaking factors to select one of the pairs. The tie-breaking factors may include the load on each of disaggregated network elements 120(2) and 120(3), minimum hops associated with the pairing, least-cost path associated with the pairing, etc. Pairing manager 105 may obtain information regarding the tie-breaking factors from disaggregated network elements 120(2) and/or 120(3). Load information may be reported after disaggregated network elements 120(2) and/or 120(3) have finished booting up (e.g., post-Day-0/1). For instance, disaggregated network elements 120(2) and/or 120(3) may report the load information periodically or when the load exceeds a threshold load value.

Techniques described herein may be compatible with any suitable configuration of RUs 125(1) and 125(2), DUs 130(1) and 130(2), and CUs 135(1) and 135(2). For instance, disaggregated network elements 115 may be configured based on any suitable split option. In one example, at least one of disaggregated network elements 120(2) and at least one of disaggregated network elements 120(3) may be treated as one collective network entity; in that case, these techniques may be implemented as one or more operations between at least one of RUs 125(1) and 125(2) and the collective network entity. Other embodiments may be envisioned.

Figure 2A:
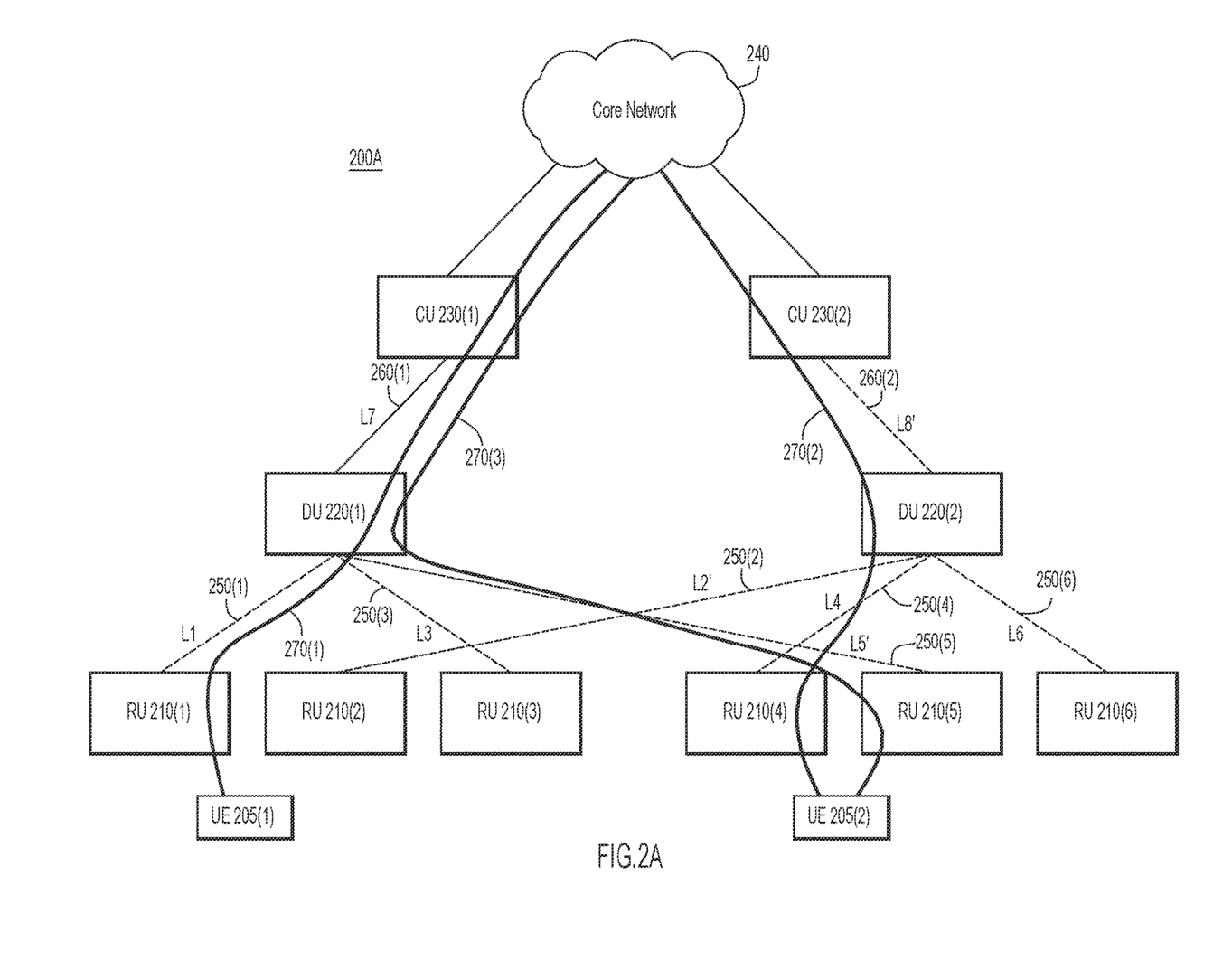
FIG. 2A illustrates a network topology in which disaggregated network elements are paired to prioritize high availability, according to an example embodiment.

FIG. 2A illustrates an example network topology 200A in which disaggregated network elements are paired to prioritize high availability. Network topology 200A includes UEs 205(1) and 205(2); RUs 210(1)-210(6); DUs 220(1) and 220(2); CUs 230(1) and 230(2); and core network 240. UE 205(2) may be within a range of both RU 210(4) and RU 210(5). As shown, topologically-adjacent ones of RUs 210(1)-210(6) are paired with different ones of DUs 220(1) and 220(2): RUs 210(1), 210(3), and 210(5) are paired with DU 220(1) via front-haul links 250(1), 250(3), and 250(5), respectively; and RUs 210(2), 210(4), and 210(6) are paired with DU 220(2) via front-haul links 250(2), 250(4), and 250(5), respectively. DU 220(1) is paired with CU 230(1) via mid-haul link 260(1), and DU 220(2) is paired with CU 230(2) via mid-haul link 260(2).

Front-haul links 250(1)-250(6) have respective latencies L1, L2', L3, L4, L5', and L6. Mid-haul links 260(1) and 260(2) have respective latencies L7 and L8'. Front-haul link 250(2) may have a higher latency (L2') than a front-haul link between RU 210(2) and DU 220(1). Front-haul link 250(5) may have a higher latency (L5') than a front-haul link between RU 210(5) and DU 220(2). Mid-haul link 260(2) may have a higher latency (L8') than a mid-haul link between DU 220(2) and CU 230(1). While L2', L5', and L8' are not the lowest possible latencies for front-haul links for RUs 210(1) and 210(5), L2', L5', and L8' may nonetheless be lower than a maximum latency threshold.

In one example, UE 205(1) may communicate with RU 210(1), and UE 205(2) may communicate with RU 210(4). Network communication paths 270(1) and 270(2) illustrate how network communications are transmitted between UEs 205(1) and 205(2) and core network 240. Network communications in network communication path 270(1) traverse RU 210(1), DU 220(1) and CU 230(1). Network communications in network communication path 270(2) traverse RU 210(4), DU 220(2) and CU 230(2).

Network topology 200A may be configured for high availability to achieve redundancy. For example, if DU 220(2) or CU 230(2) fails, UE 205(2) may switch over to RU 210(5). Network communication path 270(3) illustrates the resulting path of network communications transmitted between UE 205(2) and core network 240. Specifically, network communications in network communication path 270(3) traverse RU 210(5), DU 220(1) and CU 230(1). Network communication path 270(3) may avoid (failed) DU 220(2) and/or (failed) CU 230(2). Thus, network topology 200A—which is configured for high availability—helps UEs 205(1) and 205(2) maintain network communications with core network 240 even in the event of one or more failures.

Figure 2B:
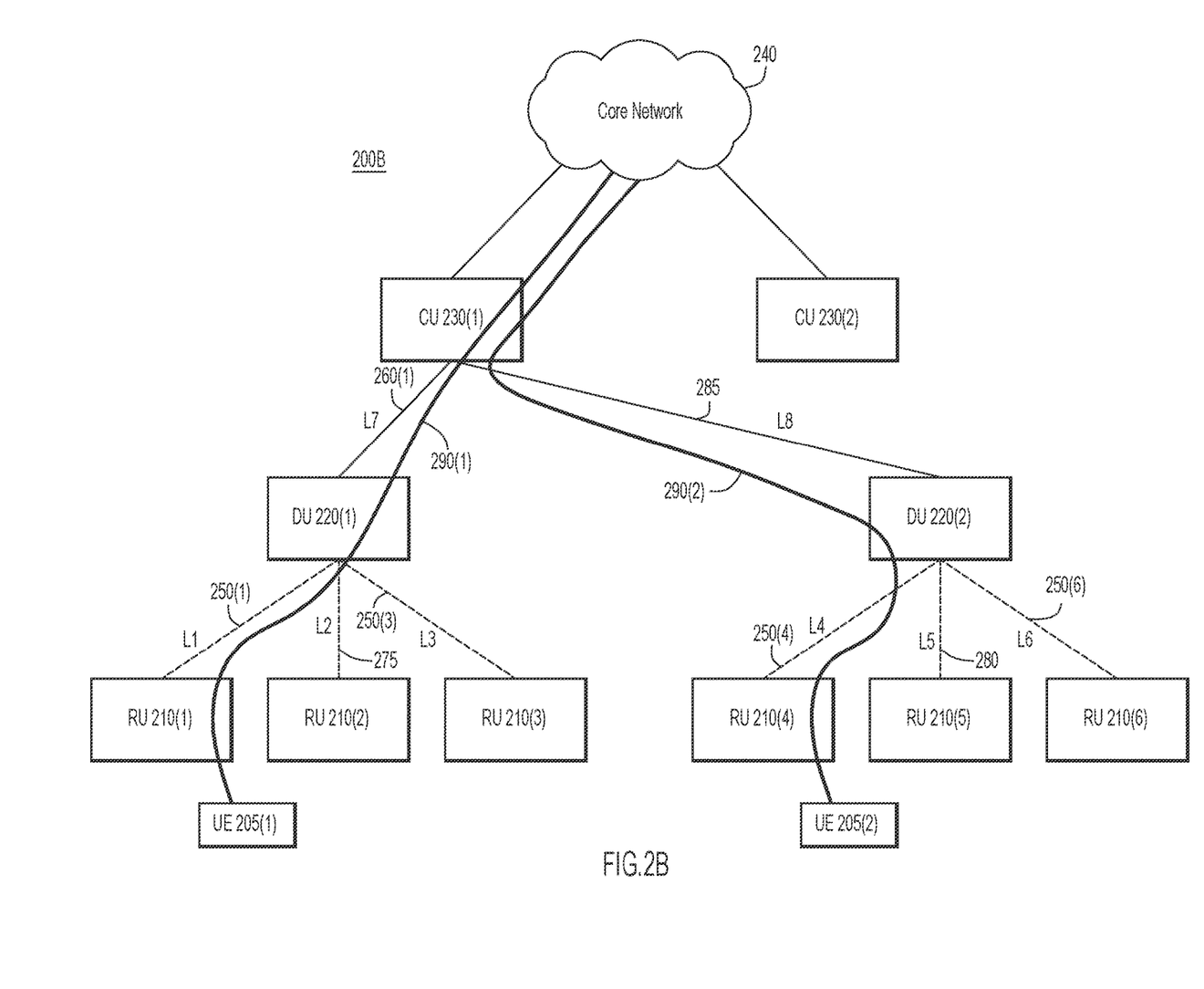
FIG. 2B illustrates a network topology in which disaggregated network elements are paired to prioritize low latency, according to an example embodiment.

FIG. 2B illustrates an example network topology 200B in which disaggregated network elements are paired to prioritize low latency. Like network topology 200A, network topology 200B includes UEs 205(1) and 205(2); RUs 210(1)-210(6); DUs 220(1) and 220(2); CUs 230(1) and 230(2); and core network 240. As shown, each of RUs 210(1)-210(6) are paired with a corresponding one of DUs 220(1) and 220(2) over a link having a lowest available latency: RUs 210(1)-210(3) are paired with DU 220(1) via front-haul links 250(1), 275, and 250(3), respectively; and 210(4)-210(6) are paired with DU 220(2) via front-haul links 250(4), 280, and 250(6), respectively. DUs 220(1) and 220(2) are paired with CU 230(1) via mid-haul links 260(1) and 285, respectively.

Front-haul links 250(1), 275, 250(3), 250(4), 280, and 250(6) have respective latencies L1-L6. Mid-haul links 260(1) and 285 have respective latencies L7 and L8. Front-haul link 275 may have a lower latency (L2) than front-haul link 250(2) (L2'). Front-haul link 280 may have a lower latency (L5) than front-haul link 250(5) (L5'). Mid-haul link 285 may have a lower latency (L8) than mid-haul link 260(2) (L8').

In one example, UE 205(1) may communicate with RU 210(1), and UE 205(2) may communicate with RU 210(4). Network communication paths 290(1) and 290(2) illustrate how network communications are transmitted between UEs 205(1) and 205(2) and core network 240. Network communications in network communication path 290(1) traverse RU 210(1), DU 220(1) and CU 230(1). Network communications in network communication path 290(2) traverse RU 210(4), DU 220(2) and CU 230(1). Thus, network topology 200B—which is configured for low latency—enables UE 205(1) and UE 205(2) to communicate with core network 240 over low-latency pairings.

Figure 3:
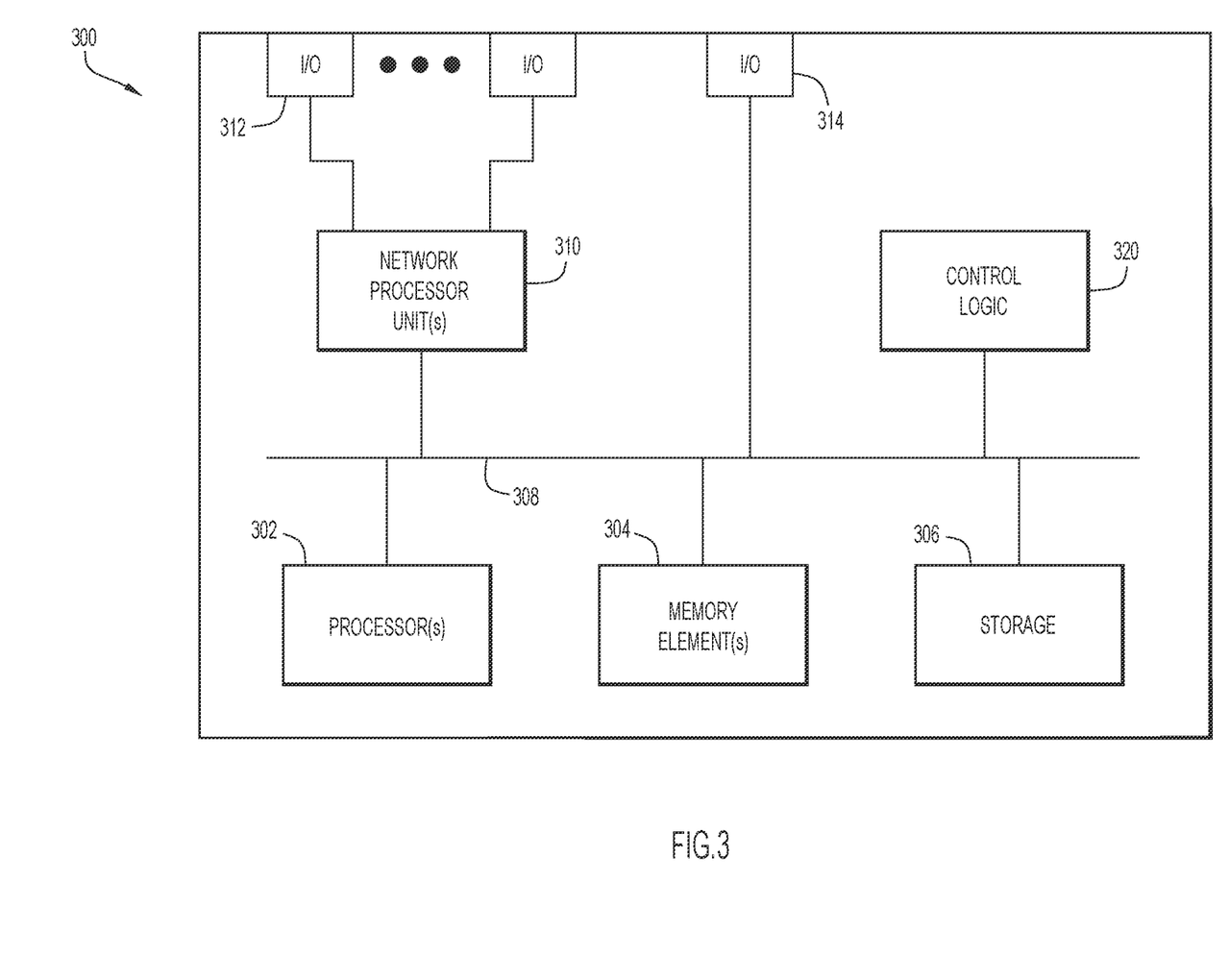
FIG. 3 illustrates a hardware block diagram of a computing device configured to perform functions associated with operations discussed herein, according to an example embodiment.

Referring to FIG. 3, FIG. 3 illustrates a hardware block diagram of a computing device 300 that may perform functions associated with operations discussed herein in connection with the techniques depicted in FIGS. 1, 2A, and 2B. In various embodiments, a computing device, such as computing device 300 or any combination of computing devices 300, may be configured as any entity/entities as discussed for the techniques depicted in connection with FIGS. 1, 2A, and 2B in order to perform operations of the various techniques discussed herein.

In at least one embodiment, computing device 300 may include one or more processor(s) 302, one or more memory element(s) 304, storage 306, a bus 308, one or more network processor unit(s) 310 interconnected with one or more network input/output (I/O) interface(s) 312, one or more I/O interface(s) 314, and control logic 320. In various embodiments, instructions associated with logic for computing device 300 can overlap in any manner and are not limited to the specific allocation of instructions and/or operations described herein.

In at least one embodiment, processor(s) 302 is/are at least one hardware processor configured to execute various tasks, operations and/or functions for computing device 300 as described herein according to software and/or instructions configured for computing device 300. Processor(s) 302 (e.g., a hardware processor) can execute any type of instructions associated with data to achieve the operations detailed herein. In one example, processor(s) 302 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 304 and/or storage 306 is/are configured to store data, information, software, and/or instructions associated with computing device 300, and/or logic configured for memory element(s) 304 and/or storage 306. For example, any logic described herein (e.g., control logic 320) can, in various embodiments, be stored for computing device 300 using any combination of memory element(s) 304 and/or storage 306. Note that in some embodiments, storage 306 can be consolidated with memory elements 304 (or vice versa), or can overlap/exist in any other suitable manner.

In at least one embodiment, bus 308 can be configured as an interface that enables one or more elements of computing device 300 to communicate in order to exchange information and/or data. Bus 308 can be implemented with any architecture designed for passing control, data and/or information between processors, memory elements/storage, peripheral devices, and/or any other hardware and/or software components that may be configured for computing device 300. In at least one embodiment, bus 308 may be implemented as a fast kernel-hosted interconnect, potentially using shared memory between processes (e.g., logic), which can enable efficient communication paths between the processes.

In various embodiments, network processor unit(s) 310 may enable communication between computing device 300 and other systems, entities, etc., via network I/O interface(s) 312 to facilitate operations discussed for various embodiments described herein. In various embodiments, network processor unit(s) 310 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 300 and other systems, entities, etc. to facilitate operations for various embodiments described herein. In various embodiments, network I/O interface(s) 312 can be configured as one or more Ethernet port(s), Fibre Channel ports, and/or any other I/O port(s) now known or hereafter developed. Thus, the network processor unit(s) 310 and/or network I/O interfaces 312 may include suitable interfaces for receiving, transmitting, and/or otherwise communicating data and/or information in a network environment.

I/O interface(s) 314 allow for input and output of data and/or information with other entities that may be connected to computing device 300. For example, I/O interface(s) 314 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 320 can include instructions that, when executed, cause processor(s) 302 to perform operations, which can include, but not be limited to, providing overall control operations of computing device 300; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 320) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, Random Access Memory (RAM), Read Only Memory (ROM), Erasable Programmable ROM (EPROM), Application Specific Integrated Circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, Digital Signal Processing (DSP) instructions, software [potentially inclusive of object code and source code], etc.) for execution by one or more processor(s), and/or other similar machine, etc. Generally, memory element(s) 304 and/or storage 306 can store data, software, code, instructions (e.g., processor instructions), logic, parameters, combinations thereof, and/or the like used for operations described herein. This includes memory elements 304 and/or storage 306 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, Compact Disc ROM (CD-ROM), Digital Versatile Disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to computing device 300 for transfer onto another computer readable storage medium.

Figure 4:
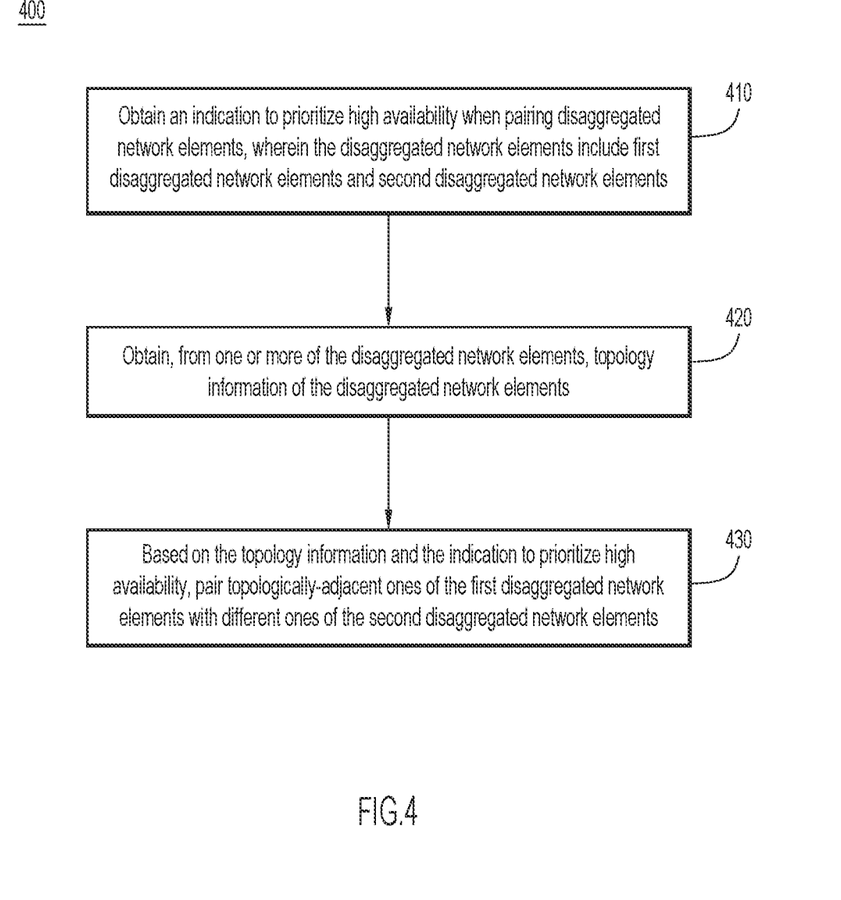
FIG. 4 illustrates a flowchart of a method for performing functions associated with operations discussed herein, according to an example embodiment.

FIG. 4 is a flowchart of an example method 400 for performing functions associated with operations discussed herein. Method 400 may be performed by any suitable entity, such as pairing manager 105 (FIG. 1). At operation 410, pairing manager 105 obtains an indication to prioritize high availability when pairing disaggregated network elements. The disaggregated network elements include first disaggregated network elements and second disaggregated network elements. At operation 420, pairing manager 105 obtains, from one or more of the disaggregated network elements, topology information of the disaggregated network elements. At operation 430, based on the topology information and the indication to prioritize high availability, pairing manager 105 pairs topologically-adjacent ones of the first disaggregated network elements with different ones of the second disaggregated network elements.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any Local Area Network (LAN), Virtual LAN (VLAN), Wide Area Network (WAN) (e.g., the Internet), Software Defined WAN (SD-WAN), Wireless Local Area (WLA) access network, Wireless Wide Area (WWA) access network, Metropolitan Area Network (MAN), Intranet, Extranet, Virtual Private Network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load-balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In one form, a method is provided. The method comprises: obtaining an indication to prioritize high availability when pairing disaggregated network elements, wherein the disaggregated network elements include first disaggregated network elements and second disaggregated network elements; obtaining, from one or more of the disaggregated network elements, topology information of the disaggregated network elements; and based on the topology information and the indication to prioritize high availability, pairing topologically-adjacent ones of the first disaggregated network elements with different ones of the second disaggregated network elements.

In one example, at least one of the first disaggregated network elements obtains the topology information from the second disaggregated network elements using one or more addresses of the second disaggregated network elements. In a further example, the one or more addresses include respective unicast addresses of the second disaggregated network elements. In another further example, one or more addresses include a multicast address of the second disaggregated network elements.

In one example, the method further comprises: obtaining an indication to prioritize low latency when re-pairing the disaggregated network elements; obtaining, from at least one of the disaggregated network elements, latency information of the disaggregated network elements; and based on the latency information and the indication to prioritize low latency, re-pairing each of the first disaggregated network elements with a corresponding one of the second disaggregated network elements over a link having a lowest available latency.

In one example, the first disaggregated network elements include radio units and the second disaggregated network elements include distributed units. In a further example, the disaggregated network elements further include centralized units.

In one example, the first disaggregated network elements include distributed units and the second disaggregated network elements include centralized units. In a further example, the disaggregated network elements further include radio units.

In another form, an apparatus is provided. The apparatus comprises: a network interface configured to obtain or provide network communications; and one or more processors coupled to the network interface, wherein the one or more processors are configured to: obtain an indication to prioritize high availability when pairing disaggregated network elements, wherein the disaggregated network elements include first disaggregated network elements and second disaggregated network elements; obtain, from one or more of the disaggregated network elements, topology information of the disaggregated network elements; and based on the topology information and the indication to prioritize high availability, pair topologically-adjacent ones of the first disaggregated network elements with different ones of the second disaggregated network elements.

In another form, one or more non-transitory computer readable storage media are provided. The non-transitory computer readable storage media are encoded with instructions that, when executed by a processor, cause the processor to: obtain an indication to prioritize high availability when pairing disaggregated network elements, wherein the disaggregated network elements include first disaggregated network elements and second disaggregated network elements; obtain, from one or more of the disaggregated network elements, topology information of the disaggregated network elements; and based on the topology information and the indication to prioritize high availability, pair topologically-adjacent ones of the first disaggregated network elements with different ones of the second disaggregated network elements.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
obtaining an indication to prioritize high availability when pairing disaggregated network elements, wherein the disaggregated network elements include first disaggregated network elements and second disaggregated network elements;
obtaining, from one or more of the disaggregated network elements, topology information of the disaggregated network elements, wherein at least one of the first disaggregated network elements is to obtain the topology information from the second disaggregated network elements using addresses of the second disaggregated network elements; and
based on the topology information and the indication to prioritize high availability, pairing topologically-adjacent ones of the first disaggregated network elements with different ones of the second disaggregated network elements.

2. The method of claim 1, wherein the one or more addresses include respective unicast addresses of the second disaggregated network elements.

3. The method of claim 1, wherein the one or more addresses include a multicast address of the second disaggregated network elements.

4. The method of claim 1, further comprising:
obtaining an indication to prioritize low latency when re-pairing the disaggregated network elements;
obtaining, from at least one of the disaggregated network elements, latency information of the disaggregated network elements; and
based on the latency information and the indication to prioritize low latency, re-pairing each of the first disaggregated network elements with a corresponding one of the second disaggregated network elements over a link having a lowest available latency.

5. The method of claim 1, wherein the first disaggregated network elements include radio units and the second disaggregated network elements include distributed units.

6. The method of claim 5, wherein the disaggregated network elements further include centralized units.

7. The method of claim 1, wherein the first disaggregated network elements include distributed units and the second disaggregated network elements include centralized units.

8. The method of claim 7, wherein the disaggregated network elements further include radio units.

9. An apparatus comprising:
a network interface configured to obtain or provide network communications; and
one or more processors coupled to the network interface, wherein the one or more processors are configured to:
obtain an indication to prioritize high availability when pairing disaggregated network elements, wherein the disaggregated network elements include first disaggregated network elements and second disaggregated network elements;
obtain, from one or more of the disaggregated network elements, topology information of the disaggregated network elements, wherein at least one of the first disaggregated network elements is to obtain the topology information from the second disaggregated network elements using addresses of the second disaggregated network elements; and
based on the topology information and the indication to prioritize high availability, pair topologically-adjacent ones of the first disaggregated network elements with different ones of the second disaggregated network elements.

10. The apparatus of claim 9, wherein the one or more addresses include respective unicast addresses of the second disaggregated network elements.

11. The apparatus of claim 9, wherein the one or more addresses include a multicast address of the second disaggregated network elements.

12. The apparatus of claim 9, wherein the one or more processors are further configured to:
obtain an indication to prioritize low latency when re-pairing the disaggregated network elements;
obtain, from at least one of the disaggregated network elements, latency information of the disaggregated network elements; and
based on the latency information and the indication to prioritize low latency, re-pair each of the first disaggregated network elements with a corresponding one of the second disaggregated network elements over a link having a lowest available latency.

13. The apparatus of claim 9, wherein the first disaggregated network elements include radio units and the second disaggregated network elements include distributed units, or the first disaggregated network elements include the distributed units and the second disaggregated network elements include centralized units.

14. One or more non-transitory computer readable storage media encoded with instructions that, when executed by a processor, cause the processor to:
obtain an indication to prioritize high availability when pairing disaggregated network elements, wherein the disaggregated network elements include first disaggregated network elements and second disaggregated network elements;
obtain, from one or more of the disaggregated network elements, topology information of the disaggregated network elements, wherein at least one of the first disaggregated network elements is to obtain the topology information from the second disaggregated network elements using addresses of the second disaggregated network elements; and
based on the topology information and the indication to prioritize high availability, pair topologically-adjacent ones of the first disaggregated network elements with different ones of the second disaggregated network elements.

15. The one or more non-transitory computer readable storage media of claim 14, wherein the one or more addresses include respective unicast addresses of the second disaggregated network elements or a multicast address of the second disaggregated network elements.

16. The one or more non-transitory computer readable storage media of claim 14, wherein the instructions further cause the processor to:
obtain an indication to prioritize low latency when re-pairing the disaggregated network elements;
obtain, from at least one of the disaggregated network elements, latency information of the disaggregated network elements; and
based on the latency information and the indication to prioritize low latency, re-pair each of the first disaggregated network elements with a corresponding one of the second disaggregated network elements over a link having a lowest available latency.

17. The one or more non-transitory computer readable storage media of claim 14, wherein the first disaggregated network elements include radio units and the second disaggregated network elements include distributed units, or the first disaggregated network elements include the distributed units and the second disaggregated network elements include centralized units.

18. The method of claim 1, further comprising:
notifying the first disaggregated network to which second disaggregated network elements the first disaggregated network elements are paired; and
notifying the second disaggregated network to which first disaggregated network elements the second disaggregated network elements are paired.

19. The apparatus of claim 9, wherein the one or more processors are further configured to:
notify the first disaggregated network elements to which second disaggregated network elements the first disaggregated network elements are paired; and
notify the second disaggregated network elements to which first disaggregated network elements the second disaggregated network elements are paired.

20. The one or more non-transitory computer readable storage media of claim 14, wherein the instructions further cause the processor to:
notify the first disaggregated network elements to which second disaggregated network elements the first disaggregated network elements are paired; and
notify the second disaggregated network elements to which first disaggregated network elements the second disaggregated network elements are paired.

* * * * *